United States Patent [19]
Shi et al.

[11] Patent Number: 6,041,939
[45] Date of Patent: Mar. 28, 2000

[54] BENEFICIATION WITH SELECTIVE FLOCCULATION USING HYDROXAMATES

[75] Inventors: Joseph C. S. Shi, Bartow; Charles Lamar Williams, Stapleton; Robert A. Lowe; Cesar I. Basilio, both of Milledgeville, all of Ga.

[73] Assignee: Thiele Kaolin Company, Sandersville, Ga.

[21] Appl. No.: 09/045,842

[22] Filed: Mar. 20, 1998

[51] Int. Cl.[7] ........................................... B03B 1/00
[52] U.S. Cl. ................... 209/5; 209/3; 423/23; 423/69; 423/155; 210/723
[58] Field of Search ................ 209/3, 4, 5; 423/23, 423/69, 155; 210/723, 725, 736

[56] References Cited

U.S. PATENT DOCUMENTS

| | | | |
|---|---|---|---|
| 2,660,303 | 11/1953 | Haseman | 209/5 |
| 3,701,417 | 10/1972 | Mercade | 209/5 |
| 3,808,021 | 4/1974 | Maynard | 106/288 B |
| 3,826,365 | 7/1974 | Mercade | 209/5 |
| 3,837,482 | 9/1974 | Sheridan, III | 209/5 |
| 3,857,781 | 12/1974 | Maynard | 209/5 |
| 3,862,027 | 1/1975 | Mercade | 209/5 |
| 4,604,369 | 8/1986 | Shi | 501/148 |
| 4,629,556 | 12/1986 | Yoon et al. | 209/166 |
| 4,871,466 | 10/1989 | Wang et al. | 252/61 |
| 4,929,343 | 5/1990 | Wang et al. | 209/166 |
| 5,368,745 | 11/1994 | Rothenberg et al. | 210/734 |
| 5,516,435 | 5/1996 | Lewellyn | 209/5 X |
| 5,522,986 | 6/1996 | Shi et al. | 209/166 |
| 5,535,890 | 7/1996 | Behl et al. | 209/5 |
| 5,584,394 | 12/1996 | Behl et al. | 209/5 |
| 5,603,411 | 2/1997 | Williams et al. | 209/5 |
| 5,685,900 | 11/1997 | Yuan et al. | 209/5 X |
| 5,810,998 | 9/1998 | Arrington-Webb et al. | 209/10 X |

FOREIGN PATENT DOCUMENTS

| | | | |
|---|---|---|---|
| 1122730 | 4/1982 | Canada | 210/734 |
| 1154771 | 9/1963 | Germany . | |

OTHER PUBLICATIONS

Clauss et al.; Selective Flocculation of Cassiterite in Mixtures with Quartz Using a Modified Polyacrylamide Flocculant; 1976; International Journal of Mineral Preocessing; vol. 3; pp. 27–34.

Shankar et al.; Selective Flocculation of Iron Oxide–Kaolin Mixtures Using a Modified Polyacrylamide Flocculant; Aug. 1988; Bulletin of Material Science; vol. 10; No. 5; pp. 423–433.

D.R. Nagaraj; The Chemistry and Application of Chelating or Complexing Agents in Minerals Separations; 1988; Reagents in Mineral Technology; Chapter 9; pp. 257–334.

Krishnan et al.; Polymeric Flocculants; 1988; Reagents in Mineral Technology; Chapter 16; pp. 485–518.

*Primary Examiner*—Tuan N. Nguyen
*Attorney, Agent, or Firm*—Kennedy, Davis & Hodge

[57] ABSTRACT

A process which uses selective flocculation with hydroxamates for the beneficiation of mixtures of mineral particles (such as kaolin clays). The increased selectivity of hydroxamates for certain mineral phases within kaolin clays and other mixtures of mineral particles improves the process over selective flocculation processes utilizing other activators.

22 Claims, No Drawings

BENEFICIATION WITH SELECTIVE FLOCCULATION USING HYDROXAMATES

TECHNICAL FIELD

This invention relates to the use of hydroxamates in the selective flocculation of a mixture of mineral particles containing minerals which chelate with hydroxamates. Examples of such chelatable minerals are minerals containing titanium, iron, copper, manganese, calcium and tin. This invention is especially useful in removing iron and titanium-containing discoloring impurities from kaolin clays.

The present invention has the advantage over other selective flocculation processes in that hydroxamates are more selective for these chelatable minerals, thereby improving the efficiency over processes using activators such as monovalent or polyvalent cations.

For ease of reference, this invention will be described with regard to kaolin clay. However, this invention will be understood as applicable to other mixtures of mineral particles, such as iron ore and copper ore.

BACKGROUND OF THE INVENTION

Kaolin is a naturally occurring, relatively fine, white clay which may be generally described as a hydrated aluminum silicate. Kaolin clay, after purification and beneficiation, is widely used as a filler and pigment in various materials, such as rubber and resins, and in various coatings, such as paints and coatings for paper.

The whiteness or brightness makes kaolin useful in applications such as coatings and fillers in paper and paint. However, kaolin clays also contain a variety of discoloring titanium and iron phases, two of these being anatase ($TiO_2$) and iron oxides, which detrimentally affect the brightness of kaolin. Therefore, there is a need to remove the discoloring phases, thereby improving the brightness and making the clay acceptable for pigment applications. Some mineral removal processes used in the beneficiation of kaolin include flotation, magnetic separation and selective flocculation.

Flocculation involves the aggregation of fine particles which are suspended (i.e., dispersed) in liquid by a bonding agent (i.e., a flocculant) that attaches to the particles. In general, the flocculant is initially adsorbed on the particles and bonds adjoining particles. The bonded particles then form larger aggregates or flocs which settle or sediment out of the suspending liquid. Flocculants can be natural products such as starch, guar gum and alginates or synthetic polymers such as polyacrylamides, polyacrylates and polyethylene oxides.

In a selective flocculation process, the objective is the selective removal of certain minerals from a mixture of mineral particles. To achieve this selectivity, the flocculant should only adsorb on certain types of mineral particles.

Selective flocculation is an effective process for recovering fine to ultrafine minerals that respond poorly to conventional beneficiation techniques. The successful utilization of selective flocculation on mixtures of fine mineral particles such as kaolin clays, iron-bearing minerals, phosphates, potash, copper-bearing minerals and coal is known in the industry.

In the selective flocculation of kaolin, the removal of titanium and iron minerals may be accomplished by flocculating the kaolin clay and leaving the dispersed discolored impurities in suspension or vice versa (i.e., the impurities are flocculated and the clay is left in suspension). The flocculated material is then settled while the dispersed phases are decanted or siphoned off to obtain the desired product.

In a first type of selective flocculation, U.S. Pat. No. 3,808,021 describes a method of selective flocculation where the kaolin is flocculated and the impurities are left dispersed in solution. This process utilizes a strongly anionic polyacrylamide polymer having a molecular weight in excess of 1,000,000. In general, the process uses phosphate-based dispersants (e.g., tetrasodium pyrophosphate and sodium tripolyphosphate) to disperse the kaolin and then flocculates the kaolinite with an anionic flocculant, which causes the kaolinite to settle and separate from the titanium impurities which remain in suspension. The clay flocs are then redispersed by high shear mixing, followed by multiple washings and delamination.

U.S. Pat. No. 3,837,482 flocculates the clay by dispersing the kaolin slurry at highly alkaline conditions with an alkali metal hydroxide and a polyanionic clay dispersant (preferably alkali metal silicate) and then flocculating with a weakly anionic partially hydrolyzed polyacrylamide. The clay then settles, leaving the discolored titanium and iron minerals in suspension.

In a second type of selective flocculation of kaolin, the iron and titanium mineral phases are flocculated and settled instead of the clay. In general, this method selectively activates the titanium and iron phases within a dispersed kaolin slurry, followed by flocculation of the discolored phases with a polymeric flocculant which causes such phases to sediment and separate from the clay.

U.S. Pat. No. 4,604,369 discloses a selective flocculation process involving the dispersion of kaolin clay using conventional dispersants and an ammonium salt conditioning agent which activates the titanium-containing phases. Activation is followed by the addition of a weakly anionic high molecular weight polymer which selectively flocculates the titanium minerals which are then removed by sedimentation.

U.S. Pat. No. 3,701,417 utilizes soluble salts as activators. U.S. Pat. No. 3,862,027 utilizes polyvalent cations (e.g., calcium, magnesium and barium) to condition the titanium-bearing phases before flocculating these phases with an anionic polymer.

U.S. Pat. No. 3,826,365 selectively flocculates the titanium and iron minerals using polyvalent cations. This method removes the flocculated phases by magnetic separation.

U.S. Pat. No. 3,857,781 flocculates the titanium and iron phases by first overdispersing the kaolin using dispersants (e.g., sodium hexamataphosphate and sodium silicate) followed by treatment of the flocculated slurry with sodium chloride. After aging, the slurry is mixed with a high molecular weight strongly anionic polyacrylamide which selectively flocculates the iron and titanium phases, thereby separating these phases from the clay.

U.S. Pat. Nos. 5,535,890; 5,584,394; and 5,603,411 disclose the use of polyvalent cations (e.g., calcium chloride) and fatty acids as activators for the iron and titanium phases. After the slurry is preconditioned with these activators, selective flocculation of the discoloring impurities is achieved by using a high molecular weight organic polymer (e.g., highly anionic polyacrylamide and/or copolymers of acrylate and acrylamide). These patents disclose that this process produces a highly purified concentrate of kaolin and a clay fraction concentrated with titanium and iron.

The first type of selective flocculation of kaolin is not practical since the reagent consumption is high because the majority of the kaolin must be flocculated. Also, contamination of the clay product by the flocculant occurs, requiring additional processes to remove the flocculant. The second method is more practical, but good selectivity of the flocculant adsorption is critical.

As shown in the above patents related to selective flocculation of iron and titanium minerals, activation of the discoloring impurities can be achieved using various monovalent, divalent and trivalent cations. The mechanism with which the cations adsorb and activate the various phases is electrostatic attraction; that is, interaction of oppositely charged species. To specifically activate the titanium and iron phases, the chemical environment (i.e., pH, dispersants present) has to be such that adsorption is specific for the discoloring minerals to be flocculated. However, even when the chemical environment is optimal, the selectivity of the various cations for the mineral surfaces can be low. The use of a fatty acid with the polyvalent cation may improve selectivity. However, if the selectivity is not high, the results can be poor mineral rejection and low clay recovery. Thus, the selectivity of the flocculation process for titanium and iron minerals is of utmost importance in optimizing the process and increasing clay recovery.

Selective flocculation is also being used to treat other mixtures of mineral particles. Iron-bearing ores, specifically taconite, are being commercially processed using selective flocculation. The fine ore is ground with caustic soda and sodium silicate to disperse the mineral particles. The ground ore is then flocculated with a corn-starch flocculant to selectively remove hematite, an iron oxide mineral. Xanthate-containing polymers were used to selectively flocculate copper- (e.g., chalcopyrite and chrysocolla) and lead- (e.g., galena) containing minerals (Krishnan & Attia, *Reagents in Mineral Technology*, Chapter 16, pp. 508–509, Marcel Dekker Inc., 1988). Separation of phosphate minerals from associated clays by selective flocculation was carried out using sodium silicate as a dispersant and starch as a flocculant (U.S. Pat. No. 2,660,303).

Potash has also been reported to be processed by selective flocculation using a nonionic polyacrylamide flocculant and/or ethoxylated alkylamic alkylguanidine complex (Krishnan & Attia, *Reagents in Mineral Technology*, Chapter 16, p. 510, Marcel Dekker Inc., 1988). U.S. Pat. No. 5,535,890, which discloses a selective flocculation process that uses fatty acid and polyvalent cations to precondition the mineral suspension, also claims application of the process to beneficiating alkaline carbonate minerals, phosphate minerals, zeolites and bauxites.

The literature discloses that the selectivity of the flocculating agent can be enhanced by the introduction of chelating functional groups. Clauss, Appleton & Vink (*International Journal of Mineral Processing*, Vol. 3, pp. 27–34, 1976) describe selective flocculation of cassiterite using a modified polyacrylamide flocculant which contains hydroxamate functional groups. Ravishankar, Pradip, Deo, Kulkarni & Gundiah (*Bulletin of Material Science*, Vol. 10, No. 5, pp. 423–433, 1988) use a modified polyacrylamide containing up to 8.3% hydroxamate functional groups to selectively flocculate iron oxide from kaolin. In this latter work, an artificial mixture of kaolin and synthetic iron oxide was dispersed with sodium silicate at a pulp density of 1%; the hydroxamate-containing modified polyacrylamide was then added to flocculate and sediment the iron oxide.

The selectivity of chelating agents for certain minerals is well known in flotation processes. Alkyl or alkaryl hydroxamic acids have shown good selectivity towards minerals containing Ti, Y, La, Ce, Nb, Ta, Sn, Fe, Mn and Cu (Nagaraj, *Reagents in Mineral Technology*, Chapter 9, pp. 289–296, Marcel Dekker Inc., 1988). Hydroxamates are powerful collectors in flotation due to this specificity for a variety of metals with which the hydroxamate can chelate. A variety of minerals containing these metals have been successfully floated as discussed in U.S. Pat. No. 3,438,494 which describes the flotation of chrysocolla (a copper-bearing silicate mineral) and iron oxides. U.S. Pat. Nos. 4,629,556 and 5,522,986 describe the use of hydroxamates in the flotation of titanium and iron phases from kaolin clays. However, hydroxamates have not been described in the selective flocculation of kaolin clays.

Therefore, there is a need in the industry for an effective selective flocculation process to remove certain impurities from kaolin clays and other mixtures of mineral particles.

SUMMARY OF THE INVENTION

Briefly described, the present invention provides a beneficiation process for the removal, by selective flocculation, of certain chelatable minerals from mixtures of mineral particles (such as kaolin clays) using a hydroxamate as a conditioner. More specifically, this invention provides a process for the selective flocculation of chelatable (with hydroxamates) minerals such as minerals containing titanium, yttrium, cerium, lanthanum, niobium, calcium, tantalum, tin, iron, manganese and copper. The process of the present invention utilizes the increased selectivity of hydroxamates for these chetable minerals which, in turn, increases the efficiency of the selective flocculation process over other methods such as those utilizing various cations as activators.

The beneficiation process of this invention is especially useful in the production of high brightness kaolin products and/or titanium rich clay products to be used in paper or paint filler and coating applications. This process is also useful in the beneficiation of certain ores, such as iron, manganese, copper and tin ores.

The present invention differs from prior selective flocculation processes described by the above-cited Clauss et al. and Ravishankar et al. references which use modified polyacrylamides containing hydroxamates, because the hydroxamate is used to condition the mineral particles and make the desired minerals more susceptible to interaction with the flocculant. Also, the hydroxamate in the present invention does not contain any polyacrylamide.

The use of hydroxamates in the present invention does not require activation of the desired minerals with a polyvalent cation such as calcium chloride as described in U.S. Pat. Nos. 5,535,890; 5,584,394; and 5,603,411. The stability of the alkaline earth complexes of hydroxamic acids differs from the stability of such complexes of fatty acids; thus, the hydroxamic acids are more selective. Also, unlike the prior art, conditioning with a hydroxamate prior to the addition of the flocculant results in a more selective adsorption of the flocculant to the surfaces of the desired chetable minerals. As explained above, the use of soluble salts, monovalent, divalent or polyvalent cations to activate the mineral impurities in kaolin prior to adsorption of the flocculant is based on electrostatic interactions. However, hydroxamates interact with the mineral impurities in kaolin by forming chelates, which have considerable covalency in the bonds formed. This interaction is stronger and more selective than the interactions described in the prior art.

Accordingly, an object of this invention is to provide a beneficiation process for treating mixtures of mineral particles.

Another object of this invention is to provide a beneficiation process for removing impurities from mixtures of mineral particles.

Another object of this invention is to provide a beneficiation process to improve the grade of mixtures of mineral particles.

Another object of this invention is to provide a beneficiation process to improve the brightness of kaolin clays.

Another object of this invention is to provide a beneficiation process which uses hydroxamates in the selective flocculation of mixtures of mineral particles.

Another object of this invention is to provide a beneficiation process which uses hydroxamates in the selective flocculation of kaolin clays.

Another object of this invention is to provide a beneficiation process which uses hydroxamates in the selective flocculation of minerals which chelate with such hydroxamates.

Still another object of this invention is to provide a beneficiation process for the removal of discoloring impurities from kaolin clays.

Still another object of this invention is to provide a process for the selective flocculation of kaolin clays to produce a product having improved brightness.

Still another object of this invention is to provide a kaolin clay product having improved brightness.

Still another object of this invention is to provide a titanium rich kaolin clay product.

These and other objects, features and advantages of this invention will become apparent from the following detailed description.

DETAILED DESCRIPTION OF THE INVENTION

The present invention relates to a process for beneficiating a mixture of mineral particles containing minerals which chelate with hydroxamates. These mixtures are first dispersed into a slurry form, and the slurry is then mixed with a hydroxamate to condition the mineral particles. During mixing, the chelatable minerals are chelated with the hydroxamate. The chelated minerals are then selectively flocculated, after which the flocculated minerals are separated from the slurry.

Separation of the minerals can be achieved by a variety of processes such as sedimentation, centrifugation, magnetic separation, dissolved air flotation and/or a combination of such processes.

From the beneficiation process of this invention, the product can be defined as having improved brightness (as would occur, for example, if the starting mixture of mineral particles is a kaolin clay) or as having improved grade (as would occur, for example, if the starting mixture of mineral particles is not a kaolin clay).

In this application, the term "grade" refers either to the content of the marketable or valuable end product in the material to be concentrated or to the impurity to be removed. In metallic ores, the percent metal (e.g., % Cu, % Fe, etc.) is often used as a measure of grade, while for some metals sold in oxide form, the grade is quoted in terms of the marketable oxide content (e.g., % $TiO_2$, % $Fe_2O_3$, etc.). The mineral content (e.g., % $CaCO_3$, % $CaF_2$, etc.) is used to quantify the grade of non-metallic ores. On the other hand, the amount of discoloring impurities present (e.g., % $TiO_2$, % $Fe_2O_3$, etc.) is used as a measure of grade in kaolin clays.

The first step in the beneficiation process of this invention is dispersion of the kaolin clay to be beneficiated. This may be done by blunging the clay with water in the presence of a dispersing agent (1–25 lb/ton). Effective dispersants include sodium silicate, sodium metasilicate, sodium hexametaphosphate and sodium polyacrylate. The preferred dispersant for this invention is sodium silicate using dosages ranging from 2–8 lb/ton. An appropriate pH modifier may be added, such as sodium carbonate or sodium hydroxide, preferably sodium hydroxide, to obtain a pH in the range of 5 to 11, preferably 8 to 10. Blunging is carried out at 40% to 70% solids, preferably 50% to 60%, using a high-energy dispersion device such as a Cowles dissolver or Hockmeyer mixer. The use of a high energy dispersion device is to ensure dispersion of the kaolin and good liberation of the chelatable minerals which are to be subsequently removed (e.g., minerals containing titanium and iron).

Following dispersion, the clay is conditioned by mixing the dispersed slurry with the appropriate activator or conditioning reagent (hydroxamate). The conditioning step is carried out at 40% to 70% solids, preferably 50% to 60%, using a high energy dispersion device such as a Cowles dissolver or Hockmeyer mixer. The amount of mixing in the presence of the activator is critical for subsequent removal of the titanium and iron phases. Sufficient mixing is required to bring the activator into contact with the minerals to be flocculated. Also controlling the conditioning of the kaolin clay is the reagent dosage. In the case of a hydroxamate, dosages ranging from 0.5–5.0 lb/ton are generally used; however, 1.0–3.0 lb/ton is preferred.

The hydroxamate activator used in the process described in the following examples is Mining Reagent S-6493, an alkyl hydroxamate commercially available from Cytec Industries, Inc., West Paterson, N.J. However, any suitable hydroxamate reagent having the following formula may be used:

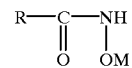

in which R is an akyl, aryl or alkylaryl group having 4–28 carbon atoms, and M is hydrogen, an alkali metal or alkaline earth metal.

Examples of suitable R groups include butyl, hexyl, octyl, dodecyl, lauryl, 2-ethylhexyl, oleyl, eicosyl, phenyl, totyl, naphthyl and hexylphenyl.

Examples of suitable alkali metals are lithium, sodium and potassium.

Examples of suitable alkaline earth metals are magnesium, calcium and barium.

Examples of the hydroxamates which are useful in the process of the invention include potassium butyl hydroxamate, potassium octyl hydroxamate, potassium lauryl hydroxamate, potassium 2-ethylhexyl hydroxamate, potassium oleyl hydroxamate, potassium dodecyl hydroxamate, potassium eicosyl hydroxamate, potassium phenyl hydroxamate, potassium naphthyl hydroxamate, potassium hexylphenyl hydroxamate, and the corresponding salts of sodium and other alkali or alkaline earth metals of such hydroxamate compounds. The salts can be converted to the corresponding acids by those skilled in the art. These hydroxamate compounds can be prepared by methods such as described in U.S. Pat. Nos. 4,629,556; 4,871,466; and 4,929,343.

During conditioning, the chelatable mineral particles are chelated (i.e., complexed) with the hydroxamate.

After conditioning, the clay slurry is diluted to a range of 5% to 40% solids, preferably 20% to 30% solids. An anionic polymer is then added to the slurry to promote flocculation of the chelatable titanium and iron mineral phases. While the type of flocculant is not critical, high molecular weight anionic polymers (e.g. acrylamide/acrylate copolymers) such as those polymers available commercially under the trademarks SHARPFLOC 9230 H (from Sharpe Specialty Chemicals Co., Macon, Ga.) and NALCO 9601 (from Nalco Chemical Co., Naperville, Illinois) are preferred.

The present invention is further illustrated by the following examples which are illustrative of certain embodiments designed to teach those of ordinary skill in this art how to practice this invention and to represent the best mode contemplated for carrying out this invention.

EXAMPLE 1

A fine-grained Tertiary kaolin from East Georgia, USA, is dispersed at 60% solids using a high-speed blunger operating at 5100 rpm for 4 minutes. The clays are dispersed with 5.2–7.4 lb/ton sodium silicate and 0.5–2.0 lb/ton sodium hydroxide is added to adjust the pH to 9–10.

An alkyl hydroxamate (Mining Reagent S-6493) is used to condition the clay at dosages ranging from 1–4 lb/ton. Conditioning of the dispersed slurry is conducted at 60% solids using a high speed Hockmeyer mixer operating at 5100 rpm for 9 minutes.

After conditioning, the slurry is diluted to 24% solids and a flocculant (Sharpfloc 9230 H) is added to promote flocculation of the titanium and iron minerals. Addition of the polymer is made while mixing at low-energy with a low shear mixer for 2 minutes. After polymer addition and mixing, the clay slurries are allowed to settle at 5 minutes per inch of slurry depth. After settling, the slurry product is siphoned off, leaving an iron and titanium rich clay sediment. Recovery of the clay slurry product of the selective flocculation process is then calculated.

The clay slurry products are leached using 16 lb/ton aluminum sulfate and 9 lb/ton sodium dithionite at a pH of 3.0–3.5 using sulfuric acid as the pH modifier. The leached products are filtered, dried, pulverized and tested for G.E. brightness, color and percent $TiO_2$ and $Fe_2O_3$.

The feed clay in these tests has a GE brightness of 86.6 and a $TiO_2$ grade of 2.45% after degritting (i.e., screening at 325 mesh) and leaching. Table A shows that there is no significant improvement in brightness with the settling of the suspension in the absence of hydroxamate and a flocculant (Control 1A). In the absence of hydroxamate to condition the kaolin suspension (Control 1B), brightness of the clay product increases from 86.9 to 87.3 despite losing about 26% of the starting material, which indicates that the flocculation is not selective.

Using the process of the present invention (Examples 1A–4A), the selectivity is increased dramatically as indicated by the significant increase in $TiO_2$ removal and brightness with little decrease in clay product recovery. At increasing hydroxamate dosages, 90+ brightness clay products are produced.

TABLE A

| Sample | S-6493 Dosage (lb/ton) | Sharpfloc 9230 H Dosage (lb/ton) | Clay Product % Recovery | % $TiO_2$ in clay | G.E. Brightness |
|---|---|---|---|---|---|
| Control 1A | 0 | 0 | 90 | 2.41 | 86.9 |
| Control 1B | 0 | 0.0875 | 74 | 2.45 | 87.3 |
| Example 1A | 1 | 0.0875 | 68 | 2.07 | 88.3 |

TABLE A-continued

| Sample | S-6493 Dosage (lb/ton) | Sharpfloc 9230 H Dosage (lb/ton) | Clay Product % Recovery | % $TiO_2$ in clay | G.E. Brightness |
|---|---|---|---|---|---|
| Example 2A | 2 | 0.0875 | 66 | 1.18 | 90.5 |
| Example 3A | 3 | 0.0875 | 67 | 0.81 | 91.4 |
| Example 4A | 4 | 0.0875 | 65 | 0.56 | 92.3 |

EXAMPLE 2

Another set of tests is conducted using a fine-grained Tertiary kaolin crude from East Georgia, USA.

The control sample is prepared using the selective flocculation process described in U.S. Pat. No. 4,604,369. The crude is dispersed in water to 60% solids with 6 lb/ton sodium hexametaphosphate and 5.3 lb/ton sodium metasilicate using a high speed blunger for 4 minutes. The dispersed kaolin crude is then conditioned with 2 lb/ton ammonium chloride in a high-speed blunger for 9 minutes. After conditioning, the activated slurry is processed as described in Example 1, except for using 0.05 lb/ton of PERCOL 730 (a polymeric flocculant available from Allied Colloids, Inc., Suffolk, Va.).

The selective flocculation sample produced using the present invention is processed as described in Example 1, using 2.5 lb/ton of Mining Reagent S-6493 as the activator. The results in Table B show the improvements in the beneficiation of kaolin with the use of hydroxamate as the activator for selective flocculation. Compared to the control process where ammonium chloride is used to activate the titanium impurities, the use of hydroxamate results in lower $TiO_2$ grade and higher brightness without any significant change in recovery.

TABLE B

| Sample | Activator/ Flocculant | Clay Product % Recovery | % $TiO_2$ in clay | G.E. Brightness |
|---|---|---|---|---|
| Control 2 | $NH_4Cl$/Percol 730 | 65 | 1.04 | 90.6 |
| Example 2 | S-6493/Sharpfloc 9230 H | 67 | 0.97 | 91.1 |

EXAMPLE 3

Selective flocculation tests are performed on fine-grained Tertiary kaolin from East Georgia, USA, using the selective flocculation process described in U.S. Patent No. 5,535,890.

The kaolin crude is blunged at 60% solids with 15 lb/ton sodium metasilicate and 0.8 lb/ton sodium polyacrylate using a high-speed blunger. 5 lb/ton tall oil and 2.5 lb/ton calcium chloride are then added and mixed for 9 minutes. After conditioning with the polyvalent cation and fatty acid, Sharpfloc 9930 (an anionic flocculant) is added under mild agitation. The flocs formed are then allowed to settle, and the clay suspension is decanted and separated from the settled material. The clay suspension is then flocculated and leached as described in Example I.

The same fine-grained East Georgia crude is also subjected to selective flocculation using 4 lb/ton alkyl hydroxamate (Mining Reagent S-6493). The sample is selectively flocculated and processed as described in Example 1. The results for both tests, given in Table C, show the improved selectivity of the flocculation process with the use of an alkyl hydroxamate. The TiO$_2$ rejection and recovery are higher when hydroxamate is used (instead of a fatty acid) to condition and activate the titanium-bearing impurities.

TABLE C

| Sample | Activator/Flocculant | Clay Product % Recovery | % TiO$_2$ in clay | G.E. Brightness |
|---|---|---|---|---|
| Control 3A | CaCl$_2$ + Tall oil; 0.1 lb/t Sharpfloc 9930 | 51 | 0.87 | 90.3 |
| Example 3B | S-6493; 0.0875 lb/t Nalco 9601 | 68 | 0.53 | 92.3 |

This invention has been described in detail with particular reference to certain embodiments, but variations and modifications can be made without departing from the spirit and scope of the invention as defined in the following claims.

What is claimed is:

1. A beneficiation process which comprises the sequential steps of:
    A. obtaining an aqueous slurry of a mixture of mineral particles containing minerals which chelate with hydroxamates;
    B. conditioning the mineral particles by mixing the aqueous slurry with a hydroxamate which chelates with the minerals and which has the formula:

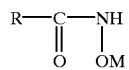

in which R is an alkyl, aryl or alkyaryl group having 4–28 carbon atoms, and M is hydrogen, an alkali metal or an alkaline earth metal, wherein the chelatable minerals are chelated;
    C. adding a flocculant to the aqueous slurry to selectively flocculate the chelated minerals; and
    D. separating the flocculated minerals from the aqueous slurry to produce a beneficiated product.

2. A beneficiation process as defined by claim 1 wherein the mixture of mineral particles is a kaolin clay.

3. A beneficiation process as defined by claim 1 wherein the mixture of mineral particles is an ore containing titanium, yttrium, cerium, lanthanum, niobium, calcium, tantalum, tin, iron, manganese or copper.

4. A beneficiation process as defined by claim 1 wherein the minerals which chelate with hydroxamates are minerals containing iron or titanium.

5. A beneficiation process as defined by claim 1 wherein the hydroxamate is an alkyl hyydroxamate.

6. A beneficiation process as defined by claim 1 wherein R is butyl, hexyl, octyl, dodecyl, lauryl, 2-ethylhexyl, oleyl, eicosyl, phenyl, totyl, naphthyl or hexylphenyl.

7. A beneficiation process as defined by claim 1 wherein M is hydrogen, lithium, sodium, potassium, magnesium, calcium or barium.

8. A beneficiation process as defined by claim 1 wherein the hydroxamate compound is potassium butyl hydroxamate, potassium octyl hydroxamate, potassium lauryl hydroxamate, potassium 2-ethylhexyl hydroxamate, potassium oleyl hydroxamate, potassium dodecyl hydroxamate, potassium eicosyl hydroxamate, potassium phenyl hydroxamate, potassium naphthyl hydroxamate, potassium hexylphenyl hydroxamate or the corresponding sodium salts of such hydroxamate compounds.

9. A beneficiation process as defined by claim 1 wherein the beneficiated product is a kaolin clay having improved brightness over the starting mixture of mineral particles.

10. A beneficiation process as defined by claim 1 wherein the beneficiated product has improved grade over the starting mixture of mineral particles.

11. A beneficiation process as defined by claim 1 wherein the beneficiated product is a titanium rich kaolin clay.

12. A beneficiated product produced by a beneficiation process which comprises the sequential steps of:
    A. obtaining an aqueous slurry of a mixture of mineral particles containing minerals which chelate with hydroxamates;
    B. conditioning the mineral particles by mixing the aqueous slurry with a hydroxamate which chelates with the minerals and which has the formula:

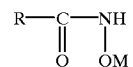

in which R is an alkyl, aryl or alkyaryl group having 4–28 carbon atoms, and M is hydrogen, an alkali metal or an alkaline earth metal, wherein the chelatable minerals are chelated;
    C. adding a flocculant to the aqueous slurry to selectively flocculate the chelated minerals; and
    D. separating the flocculated minerals from the aqueous slurry to produce a beneficiated product.

13. A beneficiated product as defined by claim 12 wherein the mixture of mineral particles is a kaolin clay.

14. A beneficiated product as defined by claim 12 wherein the mixture of mineral particles is an ore containing titanium, yttrium, cerium, lanthanum, niobium, calcium, tantalum, tin, iron, manganese or copper.

15. A beneficiated product as defined by claim 12 wherein the minerals which chelate with hydroxamates are minerals containing titanium or iron.

16. A beneficiated product as defined by claim 12 wherein the hydroxamate is an alkyl hyydroxamate.

17. A beneficiated product as defined by claim 12 wherein R is butyl, hexyl, octyl, dodecyl, lauryl, 2-ethylhexyl, oleyl, eicosyl, phenyl, totyl, naphthyl or hexylphenyl.

18. A beneficiated product as defined by claim 12 wherein M is hydrogen, lithium, sodium, potassium, magnesium, calcium or barium.

19. A beneficiated product as defined by claim 12 wherein the hydroxamate compound is potassium butyl hydroxamate, potassium octyl hydroxamate, potassium lauryl hydroxamate, potassium 2-ethylhexyl hydroxamate, potassium oleyl hydroxamate, potassium dodecyl hydroxamate, potassium eicosyl hydroxamate, potassium phenyl hydroxamate, potassium naphthyl hydroxamate, potassium hexylphenyl hydroxamate or the corresponding sodium salts of such hydroxamate compounds.

20. A beneficiated product as defined by claim 12 wherein such product is a kaolin clay having a brightness value which is improved over the brightness value of the starting mixture of mineral particles.

21. A beneficiated product as defined by claim 12 wherein such product has improved grade over the starting mixture of mineral particles.

22. A beneficiated product as defined by claim 12 wherein such product is a titanium rich kaolin clay.

* * * * *